(12) United States Patent
Hayashi et al.

(10) Patent No.: US 8,149,095 B2
(45) Date of Patent: Apr. 3, 2012

(54) GATEWAY DEVICE ALLOWING HOME NETWORK APPLIANCES TO BE INTRODUCED AND CONTROLLED OVER A NETWORK AND A CONTROL METHOD THEREFOR

(75) Inventors: Jun Hayashi, Tokyo (JP); Takaaki Horibuchi, Saitama (JP); Mitsuharu Ozawa, Kanagawa (JP); Yoshinobu Kimura, Saitama (JP); Masahide Nakamura, Hyogo (JP); Yusuke Fukuoka, Osaka (JP)

(73) Assignees: Oki Electric Industry Co., Ltd., Tokyo (JP); Nara Institute of Science and Technology, Nara (JP)

(*) Notice: Subject to any disclaimer, the term of this patent is extended or adjusted under 35 U.S.C. 154(b) by 820 days.

(21) Appl. No.: 12/230,519

(22) Filed: Aug. 29, 2008

(65) Prior Publication Data

US 2009/0072991 A1 Mar. 19, 2009

(30) Foreign Application Priority Data

Sep. 19, 2007 (JP) .................. 2007-242399

(51) Int. Cl.
*G09F 25/00* (2006.01)
*G08B 9/00* (2006.01)
*G08B 25/00* (2006.01)
*G08B 23/00* (2006.01)
*G07C 9/00* (2006.01)
*H04B 1/38* (2006.01)
*G06F 15/177* (2006.01)

(52) U.S. Cl. .............. 340/286.02; 340/286.01; 340/288; 340/307; 340/313; 340/11.1; 455/557; 709/220

(58) Field of Classification Search .................. 455/557
See application file for complete search history.

(56) References Cited

U.S. PATENT DOCUMENTS

| 5,333,198 | A  | * | 7/1994 | Houlberg et al. ............. 380/270 |
| 6,678,535 | B1 | * | 1/2004 | Narayanaswami ........... 455/557 |
| 6,901,439 | B1 | * | 5/2005 | Bonasia et al. ............... 709/220 |
| 2002/0133795 | A1 | * | 9/2002 | Yamada ........................... 716/4 |
| 2005/0033820 | A1 | * | 2/2005 | Steindl ......................... 709/213 |
| 2005/0068222 | A1 | * | 3/2005 | Krzyzanowski et al. ..... 341/176 |

FOREIGN PATENT DOCUMENTS

JP 2002-315066 10/2002
JP 2006-227825 8/2006

OTHER PUBLICATIONS

ASCII (Japanese), retrieved on Nov. 29, 2011.*
"Toshiba to Announce Bluetooth Solution to Network Home Appliances and Home Terminal Supporting Web Standards", [On Line], retrieved on Jul. 13, 2007, on the website, <URL: http: //ascii24.com/news/i/hard/article/2002/02/05/print/633371.h tml>, referred to in paragraph 0002 of the description.

* cited by examiner

*Primary Examiner* — Daniel Wu
*Assistant Examiner* — Pameshanand Mahase
(74) *Attorney, Agent, or Firm* — Rabin & Berdo, P.C.

(57) ABSTRACT

A gateway device includes a base processor which converts a signal input from an IP network to a signal which can be handled by the gateway device, and a home appliance control processor having a controller which converts the signal which can be handled by the gateway device to a control signal in compliance with the communications protocol of a home appliance to be controlled. The controller stores, on a table, information about the communications protocol, driver, controllable setting condition and status of respective appliances to be controlled in association with each other. The controller also includes a conversion functional block which converts information supplied to the control information of the communications protocol of the respective appliances to be controlled on the basis of the stored information.

11 Claims, 9 Drawing Sheets

FIG. 5

```
POST/index.cgi HTTP/1.1
Host : test.com
     .
     .
     .
Vender ID=xxxxxxxxxxxx
 Device ID=xxxxxxxxxxxx
```

FIG. 6

```
200OK HTTP/1.1
     .
     .
Device URL=http://test.com/driver/ir_xxxx
Status Table URL=http://test.com/status/tv_xxxx
```

FIG. 8

| PRODUCT | DRIVER | APPLIANCE CONDITION | |
| --- | --- | --- | --- |
| | | ITEM | STATUS |
| TELEVISION MONITOR | IR | POWER | OFF |
| | | CHANNEL | 7 |
| | | VOLUME | 15 |
| VIDEO RECORDER | DLNA | POWER | ON |
| | | CHANNEL | 8 |
| | | DAY OF WEEK | THURSDAY |
| | | REC START | 22:00 |
| | | REC END | 23:00 |
| | | REC TARGET | HARD DISK |
| ⋮ | ⋮ | ⋮ | ⋮ |

GATEWAY DEVICE ALLOWING HOME NETWORK APPLIANCES TO BE INTRODUCED AND CONTROLLED OVER A NETWORK AND A CONTROL METHOD THEREFOR

BACKGROUND OF THE INVENTION

1. Field of the Invention

The present invention relates to a gateway device, and more particularly to a gateway device for connecting a network appliance such as a home electronics or audio/video device to a telecommunications network by means of communications protocol of the appliance to make information on the appliance available. The present invention also relates to a method of controlling a network appliance such as a home electronics or audio/video device, and more particularly to a method of controlling such an appliance in terms of introducing the appliance to be connected to a telecommunications network, obtaining information on controlling, operating and monitoring the appliance introduced in accordance with communications protocol of the appliance, and controlling the appliance on the basis of the information obtained.

2. Description of the Background Art

In recent years, along with the advancement of technology and the evolution of information home appliances, some kinds of appliances having network communications capability have been on sale, as known from the website, "Toshiba Announces Bluetooth Solution to Network Home Appliances and Home Terminal Supporting Web Standards"<http://ascii24.com/news/i/hard/article/2002/02/05/print/633371.html>, for example, retrieved on Jul. 13, 2007. However, when making use of the network system, it is not easy to actually install network home appliances having Bluetooth (trademark) communications capability which are described in this website. Also, the applicability of such appliances is restrictive. With these shortcomings, the replacement of such network appliances connected to a network system is possible only in accordance with the convenience of providers of the network appliances, so that end users have no alternatives in this regard.

In the case of the solutions as described in Japanese Patent Laid-Open Publication Nos. 2002-315066 and 2006-227825, when an end user uses a network appliance by connecting it to a telecommunications network, the network appliance operates only by use of a prescribed communications protocol which is supported by that network appliance. The operation of a network appliance thus depends on the operational environment of the network to which the network appliance is connected, so that it is difficult to replace the connected network appliances as described above. In addition, for usual end users, it is also difficult to change the communications protocol used by the network appliance.

Furthermore, even where the replacing and replaced network appliances share the same communications protocol, network appliance suppliers sometimes employ their own rules or procedures respectively. Because of this, the installability of network appliances is hindered.

SUMMARY OF THE INVENTION

It is an object of the present invention to provide a gateway device and a control method capable of dynamically handling a plurality of communications protocols and making it easy for end users to replace network appliances.

In accordance with the present invention, a gateway device connectable to a telecommunications network and an electronics appliance to be controlled comprises: an input/output circuit for receiving information to the network, and output information from the appliance to the network; a format converter for converting information supplied to first information in a first format handled by the network and second information in a second format handled by the gateway device; and a controller for converting the second information to control information handled by a communications protocol of the appliance, the controller comprising: a binder for binding information about the communications protocol, a driver, a control setting condition and a status of the appliance to each other; a memory for storing the information bound; and a converter responsive to the information stored in the memory for converting the control information to either of the control information corresponding to the communications protocol of the appliance and response information to be outputted over the network.

In accordance with another aspect of the present invention, a method of controlling an electronics appliance to be controlled on a basis of information supplied over a telecommunications network, comprising the steps of: retrieving first information for operating the appliance when the first information is not available; selecting the first information and downloading the selected first information; converting the selected first information to second information in a predetermined format; binding the second information to a communications protocol, a driver, a control setting condition and a status of the appliance and storing the bound second information; converting the information supplied to control information corresponding to the communications protocol of the appliance; generating a drive signal on a basis of the control information; and outputting a control signal to the appliance in response to the drive signal.

By this configuration, it is possible to use a home appliance to be controlled without rebooting the home appliance and the home network system by transferring and receiving information to and from the network through the input/output circuit, converting information by the format converter to the first information in the first format which can be handled by the network and second information in the second format which can be handled by the gateway device, and converting control information by the controller in the second format to control information in any of the formats which can be handled respectively by the communications protocols of the plurality of appliances to be controlled, storing in the memory the information about the communications protocol, driver, controllable setting condition and status of each appliance to be controlled in association with each other, and converting information supplied by the conversion functional block to the control information of the communications protocol of each appliance to be controlled on the basis of the information stored in the memory.

Accordingly, the gateway device makes it possible to use a network-connected appliance by dynamically supporting its communications procedure even when the communications procedure is specific to the supplier of this network-connected appliance which uses the same communications protocol, and easily accomplish the functions of authenticating, registering, changing and removing appliances connected to the home network.

BRIEF DESCRIPTION OF THE DRAWINGS

The objects and features of the present invention will become more apparent from consideration of the following detailed description taken in conjunction with the accompanying drawings in which:

FIGS. 5 and 6 show an example of an HTTP (Hyper-Text Transfer Protocol) request and an HTTP response, respectively, output from the home gateway device shown in FIG. 2;

FIG. 8 shows an example of the data for binding which is stored on the table shown in FIG. 3.

DESCRIPTION OF THE PREFERRED EMBODIMENT

Figure 1:
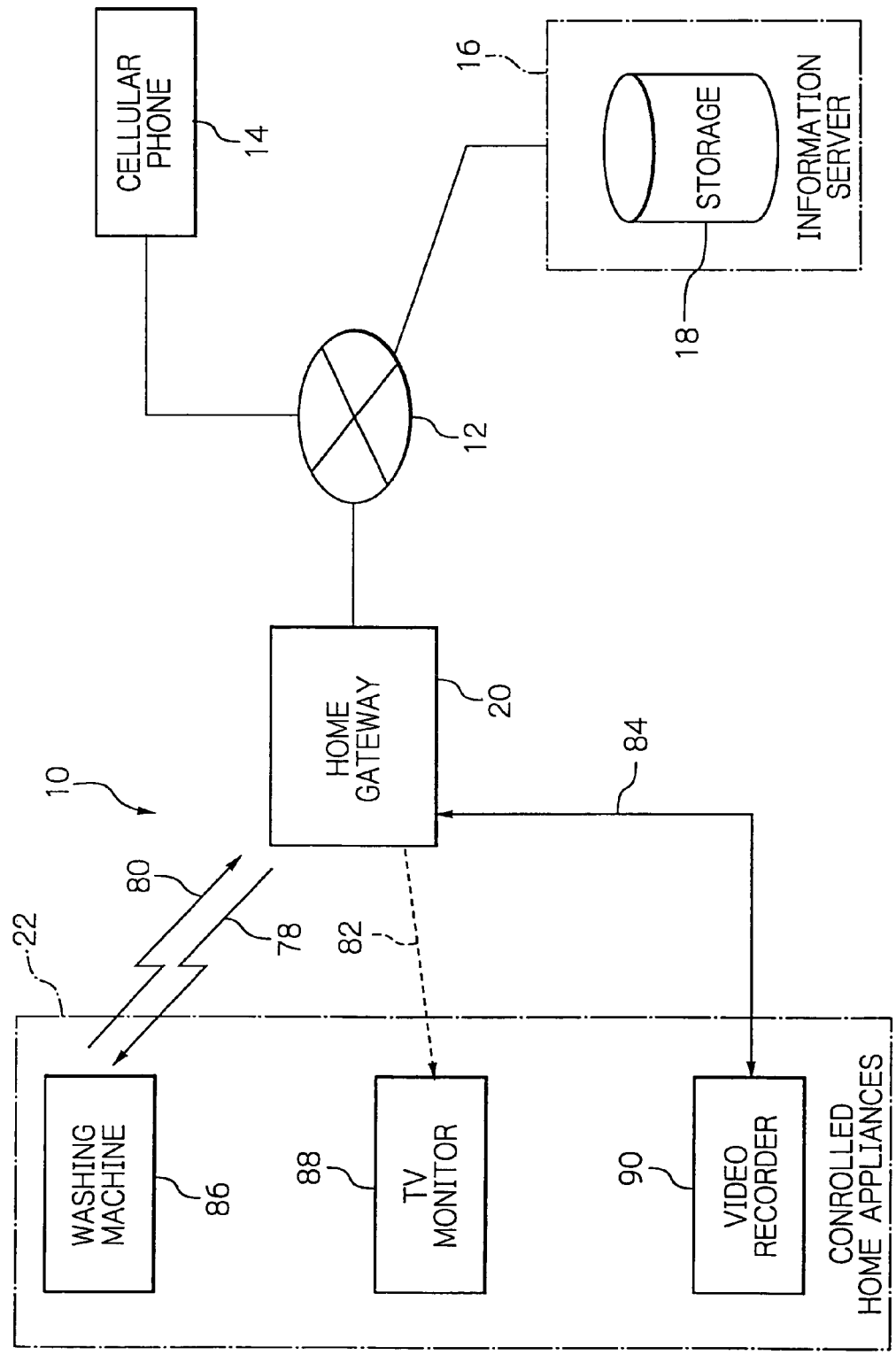
FIG. 1 is a schematic diagram showing the configuration of a home network system including a home gateway device in accordance with an illustrative embodiment of the present invention.
Figure 2:
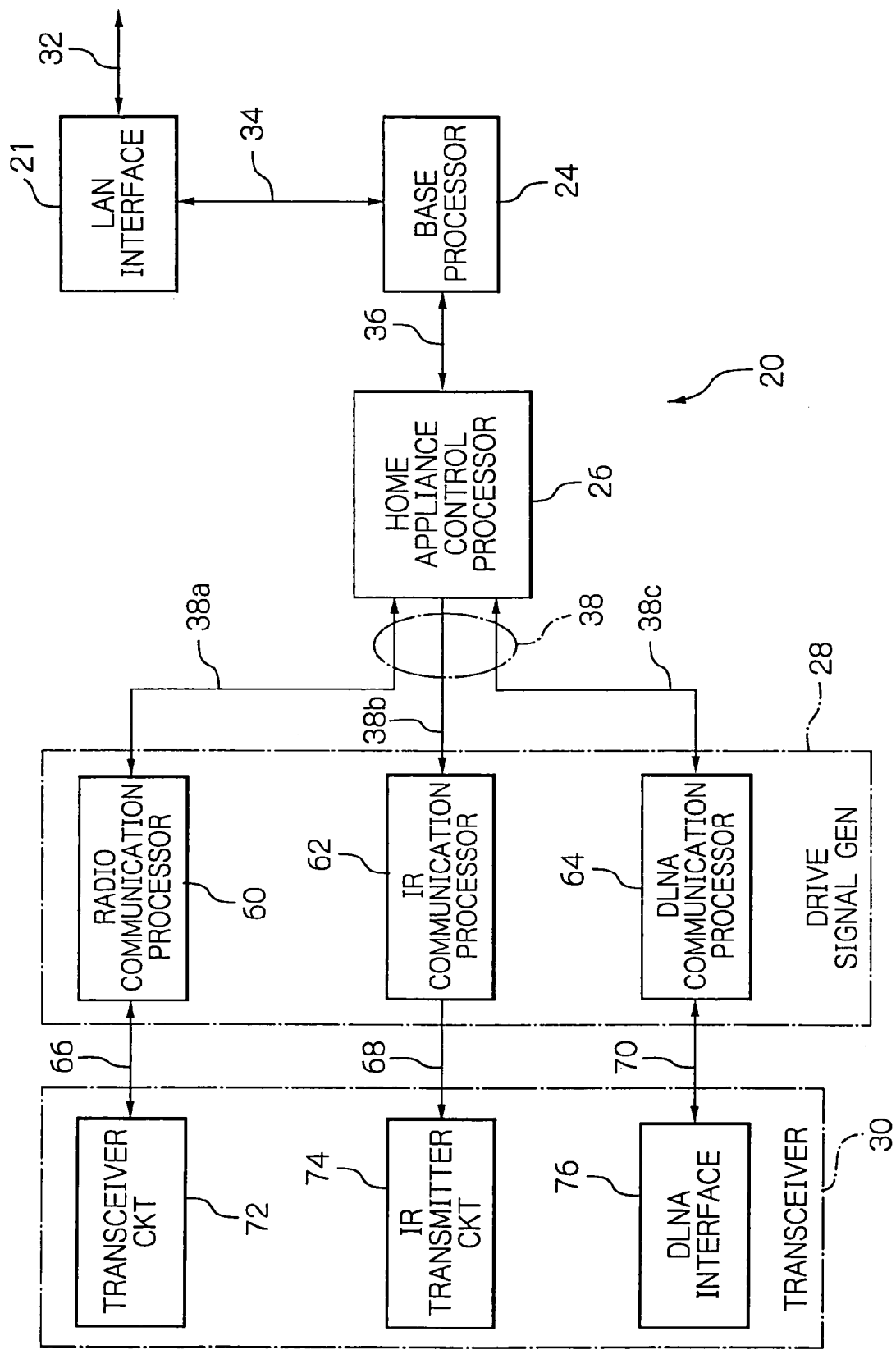
FIG. 2 is a block diagram schematically showing the configuration of the home gateway device shown in FIG. 1.

Now, a gateway device in accordance with an illustrative embodiment of the present invention will be described in detail with reference to the accompanying drawings. Generally, as shown in FIG. 1, the gateway device 20 in accordance with the illustrative embodiment serves for communications between an IP (Internet Protocol) network 12 and a LAN (Local Area Network), which may be the Internet and a home network, respectively, in this embodiment by use of IP protocol. The gateway device 20 is provided, as shown in FIG. 2, with a base processor 24 which converts a signal input from the IP network 12 to a signal which can be handled by the gateway device 20, and a home appliance control processor 26 having a controller 40, FIG. 3, which converts the signal which can be handled by the gateway device 20 further to a control signal in compliance with the communications protocol of home appliances to be controlled 22. The controller 40 includes a table 48 and stores therein information about the communications protocol, driver, controllable setting condition and status of the respective appliances to be controlled 22 in association with each other.

Figure 3:
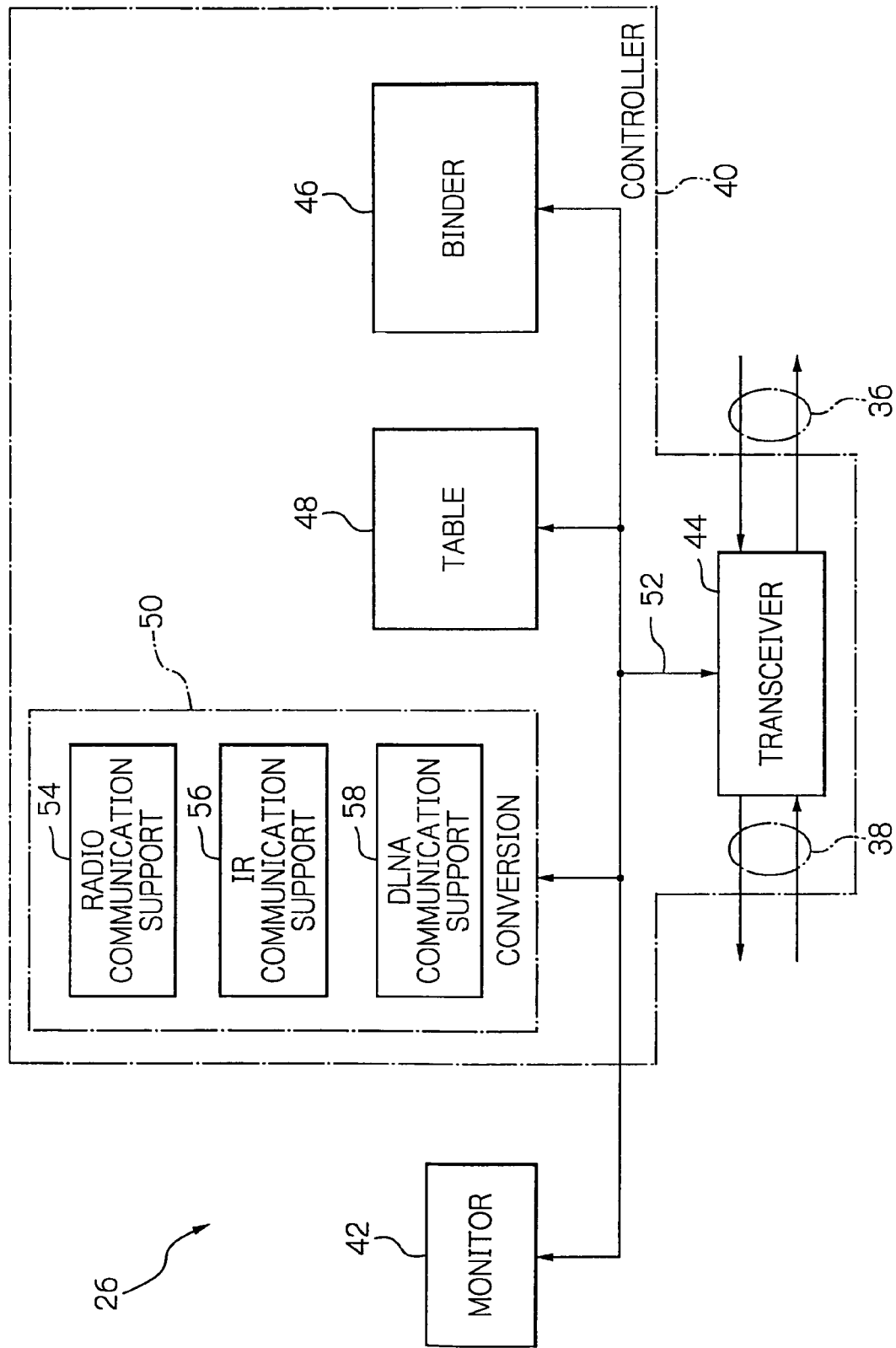
FIG. 3 is a block diagram schematically showing the configuration of a home appliance control processor of the home gateway device shown in FIG. 2.

Also as seen from FIG. 3, the controller 40 is provided with a conversion functional block 50 which converts given information to control information of the communications protocol of the respective appliances to be controlled 22 on the basis of the stored information. It is thus possible to use home appliances to be controlled 22 without rebooting, or restarting, the respective home appliances 22 and the home network system 10. That configuration allows the home gateway device 20 to use a network-connected appliance by dynamically or adaptively supporting its communications procedure even when the communications procedure is specific to the supplier of this network-connected appliance which uses the same communications protocol, and easily implement the functions of authenticating, registering, changing and removing appliances connected to the home network.

In the followings, the home gateway device 20 in accordance with the present embodiment will be more specifically described. Description of part or elements not directly relevant to understanding the present invention will be dispensed with for the purpose of avoiding redundant description.

Again with reference to FIG. 1, the home network system 10 is connected to the IP network 12. To the IP network 12, a mobile phone subscriber set, such as a cellular phone, 14 and an information server 16 may be connected in the embodiment. The cellular phone 14 is provided with the function of transmitting a command to any of the home appliance to be controlled 22 of the home network system 10, receiving a status signal from the home appliances 22, and visually and/or audibly displaying the received status. The cellular phone 14 communicates with the home network system 10 over the IP network 12.

The information server 16 is provided with a storage device 18 for storing data indicative of which standard the operation of the controlled home appliance 22 in the home network system 10 is based on. More specifically, the storage device 18 is used to store information about communications standards for use in each controlled home appliance 22 in the form of database. The information server 16 is responsive to a request to provide the home network system 10 with the communications standards.

The home network system 10 includes the home gateway device 20 and a group of home appliances 22 to be controlled. In the context, the reference numeral 22 is directed to not only the group of home appliances but also each of the appliances. The home gateway device 20 is provided with the function of communicating with external devices, such as the mobile phone 14, over the IP network 12 and communicating with the controlled home appliances 22 capable of performing communications on the basis of different communications standards. For the purpose of implementing the above function, as shown in FIG. 2 the home gateway device 20 includes a LAN interface circuit 21, a base processor 24, a home appliance control processor 26, a drive signal generator 28 and a transceiver 30, which are interconnected as illustrated.

The LAN interface circuit 21 is provided with the function of communicating with a mobile telecommunications terminal such as the cellular phone 14 and the information server 16. The LAN interface circuit 21 performs data transmission and reception by use of HTTP (Hyper-Text Transfer Protocol) The HTTP is a protocol which is used for data transmission and reception between a Web server and a client such as a Web browser. By use of HTTP, it is possible to transmit and receive data including HTML (Hyper-Text Markup Language) files, and other files such as image, sound and motion picture files which are associated with the HTML files, together with information about the layout on a page in which text, images and the like are displayed. The LAN interface circuit 21 enables communications with the cellular phone 14 and the information server 16 to exchange data 32. On the other hand, the LAN interface circuit 21 communicates with the base processor 24 to transfer and receive data 34.

The base processor 24 serves to search a home appliance signal database selectively for information about a home appliance 22 which performs communications. In addition, the base processor 24 serves to convert a signal input from the LAN interface circuit 21 to a signal which can be handled by the home appliance control processor 26, and transmit the converted signal to the home appliance control processor 26. The base processor 24 outputs a search request signal as the data 34 to the LAN interface circuit 21, and receives a search result signal as the data 34. The base processor 24 outputs the search result signal as data 36 to the home appliance control processor 26. Signals or data are designated with reference numerals of connections on which they are conveyed.

The home appliance control processor 26 is provided with a communications protocol conversion function for enabling communications between devices having different communications protocols in accordance with home appliance signal information indicative of the communications protocol of the respective home appliances 22, a binding function for binding each command to corresponding home appliance signal information, a data storing function for storing data, and a data transmission and reception function for transmitting and receiving data. The home appliance control processor 26 stores home appliance signal information associated with the respective home appliances 22 in advance, and transmits instruction information such as a command signal from the cellular phone 14 to the drive signal generator 28 as the data 38 supported by target one of the home appliances 22 which is designated by the cellular phone 14. At start-up, the home appliance control processor 26 downloads home appliance signal information from the information server 16 as the data 32, and generates a command signal to the drive signal generator 28 as the data 38 supported by the home appliance to be controlled 22. Thus the data 38 includes a signal indicative of a command in conformity with the communications protocol to be used.

More specifically, as illustrated in FIG. 3, the home appliance control processor 26 includes the controller 40 and a display monitor 42. The controller 40 includes a transceiver 44, a bind functional block 46, a table 48 and a conversion functional block 50. The controller 40 is capable of dynamically handling a plurality of communications protocols to readily implement the functions of authenticating, registering, changing and removing appliances 22 connected to the network 12. The transceiver 44 is interconnected to the bind functional block 46, the table 48, the conversion functional block 50 and the monitor 42. As has been discussed above, the transceiver 44 transfers and receives data 52 to and from the base processor 24 and the drive signal generator 28. The transceiver 44 may be dispensed with. The bind functional block 46 binds the home appliance signal information of a home appliance 22 to the communications protocol of that home appliance 22 so as to relate the home appliance 22, and the home appliance signal information and command information of that home appliance 22 to each other as an entry of the table 48.

The table 48 is implemented by a memory in which a plurality of entries of the table are stored. The conversion functional block 50 is capable of converting command information supplied corresponding to the home appliance signal information to a signal in conformity with the communications protocol which is used by the home appliance to be controlled 22. The conversion functional block 50 can be set up in accordance with the types' of communications protocols to be used. More specifically, even when a communications protocol is modified, extended or introduced anew, the conversion functional block 50 can support this communications protocol by downloading and saving an appropriate conversion program. The conversion functional block 50 is responsive to information supplied from the base processor 24 to produce command information and provide an appropriate signal supporting a different communications protocol.

In addition to this, the conversion functional block 50 is provided with the function of converting a status signal transmitted from the home appliance 22 to equivalent data corresponding to HTTP. The conversion functional block 50 includes a radio communication support subsection 54, an infrared (IR) communication support subsection 56 and a DLNA (Digital Living Network Alliance) communication support subsection 58.

The radio communication support subsection 54 converts instruction information for communication in compliance with, for example, Bluetooth (trademark), ZigBee (trademark), IEEE (Institute of Electrical and Electronic Engineers) 802.11b which is a standard of wireless LAN, and ECHONET (trademark) which is a standard of information home appliances. The radio communication support subsection 54 converts a status signal transmitted from a home appliance 22 by use of its communications protocol to equivalent data corresponding to HTTP.

The infrared communication support subsection 56 converts instruction information in accordance with the communications standard for remote controllers. The infrared communication support subsection 56 converts, immediately after converting the instruction information, a status signal indicative of the completed transmission of the instruction information to equivalent data corresponding to HTTP, and outputs the converted information to the transceiver 44.

The DLNA communication support subsection 58 converts instruction information in accordance with the DLNA communications standard. The radio communication support subsection 54 outputs the instruction information converted by the radio communication support subsection 54, the infrared communication support subsection 56 or the DLNA communication support subsection 58 to the transceiver 44 as the data 52. The controller 40 outputs the converted instruction information from the transceiver 44 to the drive signal generator 28 as the data 38.

The DLNA communication support subsection 58 converts a status signal transmitted from the home appliance by use of the communications protocol thereof to equivalent data corresponding to HTTP. The operation of the conversion functional block 50 will be described later. The home gateway device 20 makes it possible to use a network-connected appliance 22 by dynamically or adaptively supporting its communications procedure even if the communications procedure is specific to the supplier of this network-connected appliance 22 which uses the same communications protocol. The monitor 42 is provided at least with the function of visually displaying the name, instruction information and current status of the connected appliances 22.

Returning to FIG. 2, the drive signal generator 28 is provided with a driver function for generating drive signals on the basis of data converted in accordance with the communications protocol to be used. The drive signal generator 28 is provided also with a data conversion function for converting the signal received by the transceiver 30 to data supported by the communications protocol. The drive signal generator 28 serves to generate the drive signals on the basis of the supplied data 38. The home gateway device 20 outputs the drive signals from the drive signal generator 28 through the transceiver 30. The drive signal generator 28 includes a radio communication processor 60, an infrared communication processor 62 and a DLNA communication processor 64.

The radio communication processor 60 generates drive signals for radio transmission, and transmits the generated signals in the form of drive signals 66 to the transceiver 30. The radio communication processor 60 converts the signals received by the transceiver 30 to data supported by the communications protocol, and outputs the converted data to the radio communication support subsection 54. The infrared communication processor 62 generates drive signals for infrared transmission, and transmits the generated signals in the form of drive signals 68. The DLNA communication processor 64 generates drive signals for a DLNA compliant appliance, and transmits the generated signals as the drive signals 70 to the transceiver 30. The DLNA communication processor 64 converts the signals received by the transceiver 30 to data supported by the communications protocol, and outputs the converted data to the DLNA communication support subsection 58 through the transceiver 44.

The transceiver 30 is provided at least with the function of transmitting and receiving the supplied data. The transceiver 30 includes a radio transceiver circuit 72, an infrared transmission circuit 74 and a DLNA interface circuit 76. As illustrated in FIG. 1, the transceiver circuit 72 transmits radio waves 78 at a predetermined frequency in response to a drive signal 66 supplied, and receives radio waves 80 from the connected appliance. The infrared transmission circuit 74 outputs infrared rays 82 in response to the drive signal 66 supplied. The DLNA interface circuit 76 transmits a DLNA signal 84 in response to the drive signal 66 supplied, and receives a responsive DLNA signal 84 in accordance with the instruction information from the connected appliance.

Returning to FIG. 1, in the case of present embodiment, the controlled home appliances 22 connected to the home network system 10 are home electronics appliances having telecommunications capability, and may include a washing machine 86, a television receiver set 88, and a video recorder/player 90. The washing machine 86 is provided with a transmitter/receiver unit, not shown, and capable of receiving the radio waves 78 supplied. The washing machine 86 receives the radio waves 78 through the transmitter/receiver, decodes instruction information carried on the radio waves 78, and operates in accordance with the instruction information. The washing machine 86 transmits a status signal representative of its operation to the home gateway device 20 through the transmitter/receiver unit.

The television receiver set 88 is provided with a transmitter/receiver unit, not shown, and capable of receiving the infrared rays 82 supplied. The television receiver set 88 receives the infrared rays 82, decodes instruction information carried on the infrared rays 82, and operates in accordance with the instruction information.

The video recorder/player 90 is provided with a DLNA interface circuit, not shown, and capable of receiving the DLNA signal 84 supplied. The video recorder/player 90 receives the DLNA signal 84 through the DLNA interface circuit, decode decodes instruction information carried on the DLNA signal 84, and operates in accordance with the instruction information. The video recorder/player 90 transmits a status signal representative of the operation to the home gateway device 20 through the transmitter/receiver unit.

Figure 4:
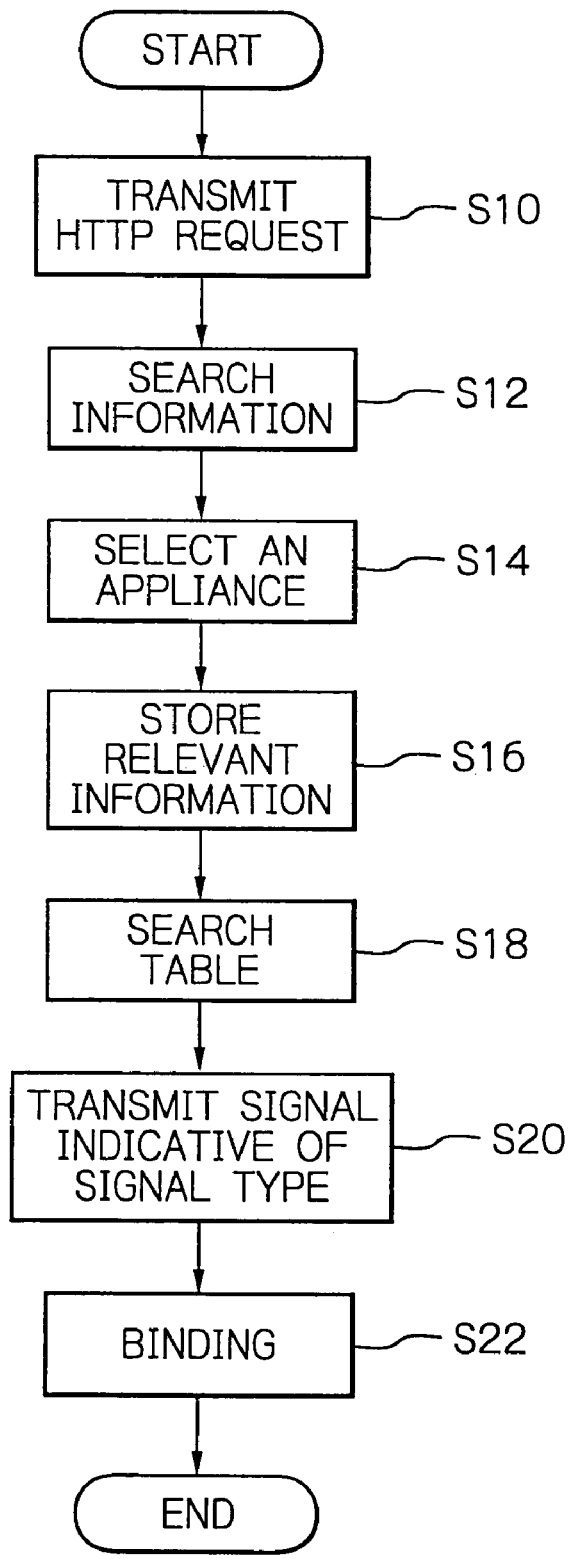
FIG. 4 is a flow chart useful for understanding the initial setting process of the home gateway device shown in FIG. 2.

Next, the operation of the home network system 10 will be described. With reference to FIG. 4, the initial setting process of the home gateway device 20 will be described in the case where a home appliance is introduced anew into the home network system 10. It is assumed here that the home appliance to be introduced anew is the television receiver set 88 as an example.

The home gateway device 20 is controlled through the cellular phone 14 by the user in this example. In step S10, the home gateway device 20 transmits, to the storage device 18 of the information server 16, an HTTP request including the identifier of the home appliance to be registered 88 by the base processor 24, as shown in FIG. 5, by connecting the cellular phone 14 to the IP network 12 and performing necessary operation thereon. The home gateway device 20 is capable of dynamically handling a plurality of communications protocols to readily accomplish the functions of authenticating, registering, changing and removing the connected appliances to and from the network system 10.

The model number of the television receiver set 88 to be introduced anew may be input to the home gateway device 20. The model number can be input with the cellular phone 14.

The home gateway device 20 searches, in step S12, for the home appliance signal information stored in the home appliance signal database which is provided in the storage device 18 of the connected information server 16 over the IP network 12. The retrieved information is supplied to the cellular phone 14 and displayed in the monitor of the cellular phone 14.

The user selects one of the model numbers among the information displayed in the monitor, not shown, corresponding to the television receiver set 88 by depressing the buttons of the cellular phone 14. The cellular phone 14 transmits, in step S14, the selected model number to the home gateway device 20.

The information server 16 supplies the corresponding information stored in the storage device 18 to the home appliance control processor 26 of the home gateway device 20. The home appliance control processor 26 downloads and saves the corresponding information in step S16. In this case, the information server 16 transmits an HTTP response as shown in FIG. 6, i.e. URLs of a compatible driver and a state table as the corresponding information. The driver is used in the home gateway device 20 to communicate with the home appliance 88 by use of the communications protocol of this home appliance.

Next, when the television receiver set 88 is actually controlled, the base processor 24 searches, in step S18, the table 48 of the controller 40 on the basis of the information received through the LAN interface circuit 21 and the information of the television receiver set 88. The controller 40 determines the signal type to be used for transmission from the table 48.

The controller 40 converts the determined signal type by the conversion functional block 50, and transmits, in step S20, the converted signal to the television receiver set 88 from the drive signal generator 28 through the transceiver 30. The television receiver set 88 is controlled by the signal supplied.

In step S22, the controller 40 automatically generates relevant data by the bind functional block 46 with reference to the information of the base processor 24 and the signal type for data transmission, and stores the generated data on the table 48. Thereafter, the home appliance control processor 26 can use an appropriate signal type for data transmission without need for searching the table 48 again. In addition, when changing the settings or performing new introduction, the home network system 10 makes it possible to use a home appliance to be controlled without rebooting, or restarting, the respective home appliances 22 and the home network system 10.

Figure 7A:
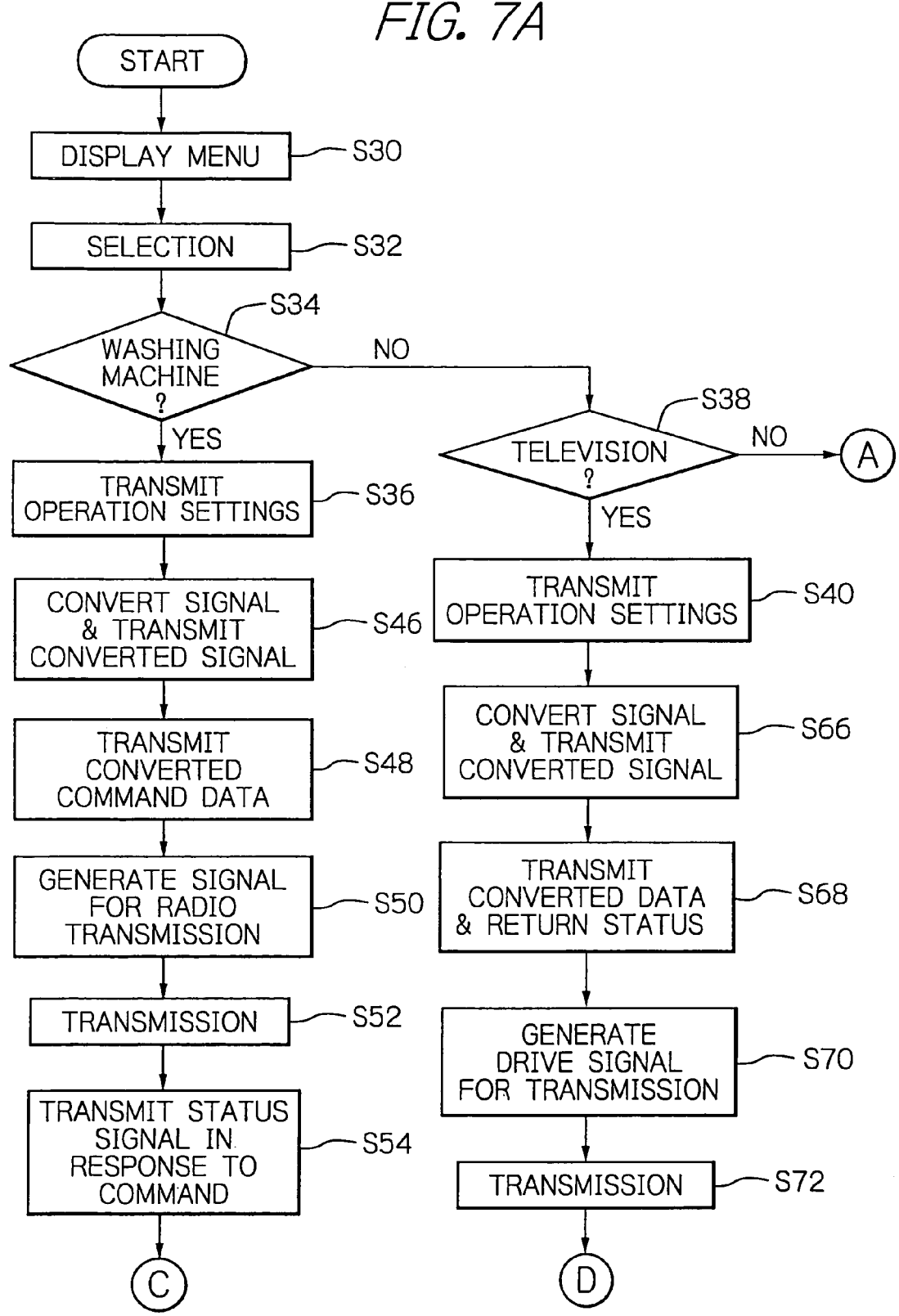
FIGS. 7A, 7B and 7C are a flow chart useful for understanding the operational procedure of the home network system shown in FIG. 1.

Next, with reference to FIG. 7A, the operation of the cellular phone 14 (or any other appropriate portable terminal device) will be described in the case where the washing machine 86, the television receiver set 88 or the video recorder/player 90 is remotely controlled over the home network system 10.

The cellular phone 14 accesses the home gateway device 20 by use of HTTP and displays a list of the controlled home appliances 22 on a menu displayed on the cellular phone 14 in step S30. The washing machine 86, the television receiver set 88 and the video recorder/player 90 are registered as the controlled home appliances 22. The user selects one of the controlled home appliances 22 in step S32.

The cellular phone 14 determines whether or not the selected home appliance to be controlled is the washing machine 86 in step S34. If the washing machine 86 is selected on the branch "YES" from step S34, the items of setting the operation thereof are selected. The setting items include, for example, the quantity of water supply, the washing time, the number of times of rinsing, the number of times of dewatering, and the mode of washing. The cellular phone 14 transmits the set of the setting items selected to the home gateway device 20 in step S36. If the washing machine 86 is not selected on the branch "NO" from step S34, then the process proceeds to step S38.

In step S38, the cellular phone 14 determines whether or not the selected home appliance to be controlled is the television receiver set 88. If the user selects the television receiver set 88 to be operative, for example, he or she manipulates the cellular phone 14 to select the operation of the television receiver set 88. Then, the user selects the operation of turning on the television receiver set 88 to proceed to the branch "YES" from step S38, and the cellular phone 14 transmits this selection to the home gateway device 20 in step S40. If the television receiver set 88 is not selected on the branch "NO" from step S38, the process proceeds to step S42 shown in FIG. 7B through connector A.

Figure 7B:
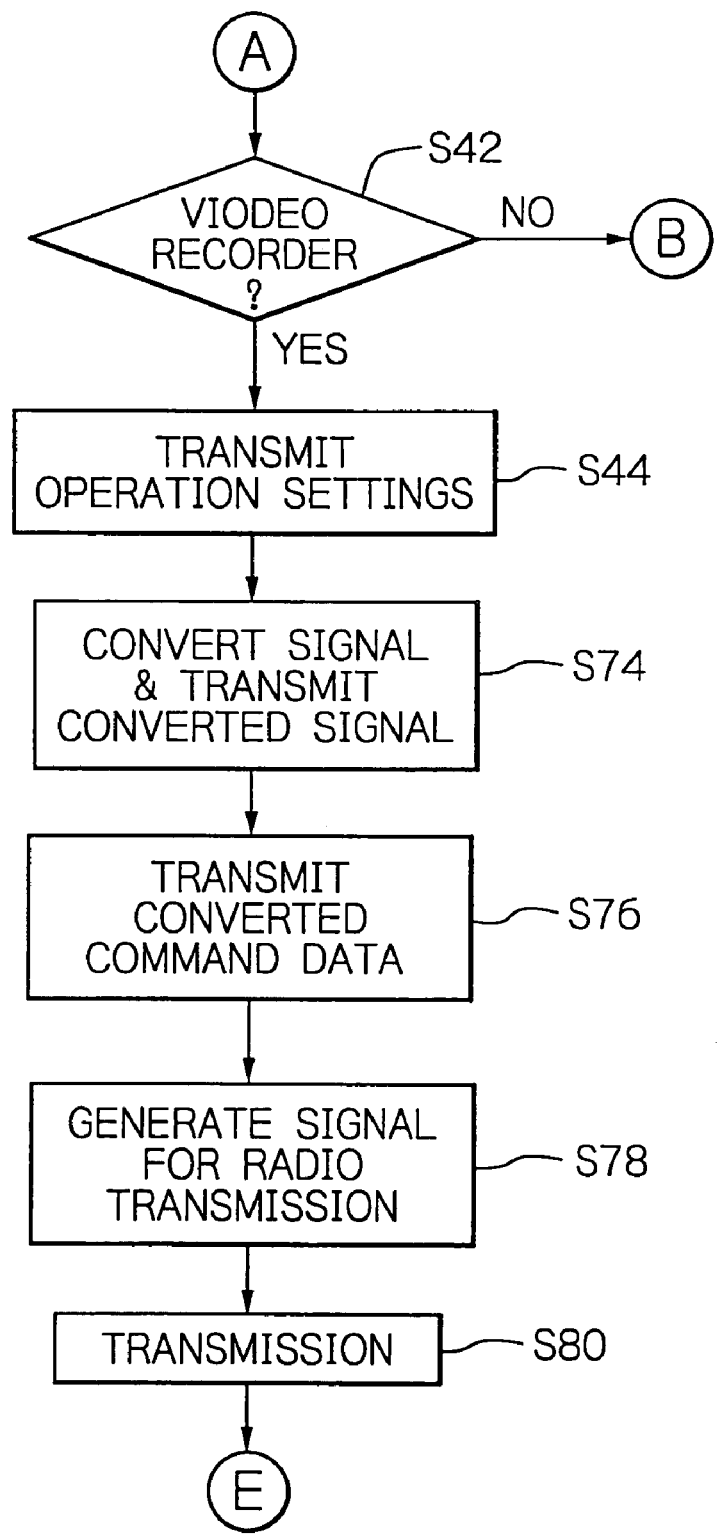

In step S42, the cellular phone 14 determines whether or not the selected home appliance to be controlled is the video recorder/player 90 as shown in FIG. 7B. If the video recorder is selected in step S42 on the branch "YES", the user selects the settings of the operation of the video recorder/player 90 with the cellular phone 14. The settings which can be selected include the settings of the day of week, start time, stop time, channel and recording mode for timer recording. The cellular phone 14 transmits the setting items thus selected to the home gateway device 20 in step S44. If the video recorder is not selected in step S42 on the branch "NO", the process is terminated through connector B to FIG. 7C.

Returning to FIG. 7A, it is assumed that the washing machine 86 is selected on the branch "YES" from step S34, followed by transmitting the settings selected to the home gateway device 20 in step S36. The signal indicative of the selected settings is converted in step S46 by the base processor 24 to a signal which can be handled by the home appliance control processor 26, and transmitted to the home appliance control processor 26. The home appliance control processor 26 determines that the signal supplied indicates a command to operate the washing machine 86 on the basis of the signal type bind data, although not shown in the figure, and transmits the command signal as converted to the radio communication processor 60 by use of the radio communications protocol in step S48. For example, the radio command signal indicates that the quantity of water supply is "18 liters", the washing time is "10 minutes", the number of times of rinsing is "twice", the number of times of dewatering is "once", and the mode of washing is "ordinary". The DLNA communication support subsection 58 of the controller 40 serves to convert these settings in accordance with the DLNA standard.

Next in step S50, the radio communication processor 60 generates a radio signal for radio transmission on the basis of the data supplied, outputs the generated radio signal to the radio transceiver circuit 72. The transceiver circuit 72 transmits a radio wave signal 78 to the washing machine 86 as the generated radio signal in step S52.

The washing machine 86 is set and operated in accordance with the operational command carried on the radio signal 78 received. The washing machine 86 transmits a status signal to the transceiver circuit 72 in the form of radio wave signal 80 in accordance with the respective steps of operation in sequence from the completion of setting in step S54. More specifically, the transceiver circuit 72 receives the radio wave signal 80 indicative of the status of the washing machine 86. The radio wave signal 80 is converted by the transceiver circuit 72 to a corresponding digital signal, which is then transmitted to the radio communication support subsection 54 of the controller 40.

Figure 7C:
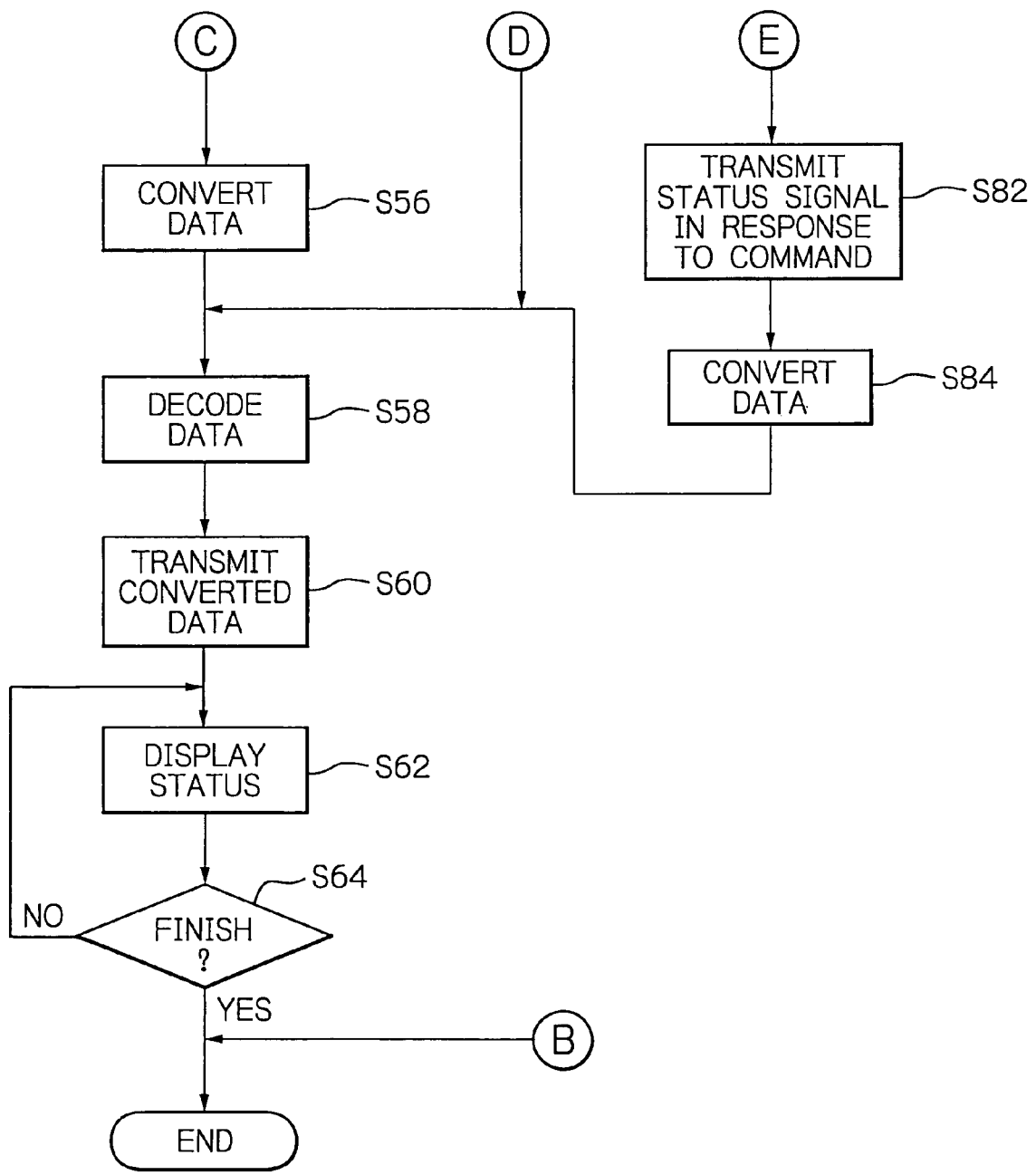

As shown in FIG. 7C through connector C, the home gateway device 20 converts in step S56 the digital signal to the data in accordance with the communications protocol by the radio communication support subsection 54 of the controller 40. The controller 40 decodes the converted data with reference to the table 48 to obtain status data contained in the converted data in step S58. The controller 40 supplies the status data to the base processor 24.

The base processor 24 converts the status data to data which can be transmitted by HTTP, and outputs HTTP data to the cellular phone 14 in step S60. The cellular phone 14 receives the HTTP data, and successively displays the status of the operation of the washing machine 86 in step S62. Namely, the status of the operation is visually displayed on the cellular phone 14 to successively indicate the completion of setting and the subsequent operational steps on a real time basis. The user can confirm the status of the operation of the washing machine 86, and determines whether to finish in step S64. If the user quits the display of the cellular phone 14 on the branch "YES" from step S64, the process is terminated. If the user wants to receive the status information on the branch "NO" from step S64, the cellular phone 14 is set to its standby state and ready for receiving a call while repeating step S62.

Returning to FIG. 7A again, in step S66, the signal containing an operational command of the television receiver set 88 is converted by the base processor 24 to data which can be handled by the home appliance control processor 26, and the data thus converted is transmitted to the home appliance control processor 26. The home appliance control processor 26 determines that the signal supplied indicates a command to operate the television receiver set 88 on the basis of the signal type bind data, which is shown in FIG. 8, and transmits the command signal as converted to the infrared communication processor 62 by use of the infrared communications protocol in step S68. For example, the converted infrared command signal transmitted from the infrared communication support subsection 56 of the controller 40 indicates that the television receiver set 88 is turned off, the channel being displayed is switched to "channel 7", the sound volume is set to "15", and so forth. The infrared communication support subsection 56 immediately generates a status signal indicative of the completion of setting, and returns the status signal to the cellular phone 14 over the IP network 12.

Next in step S70, the infrared communication processor 62 generates a drive signal for infrared transmission on the basis of the data supplied, and outputs the infrared transmission drive signal to the infrared transmission circuit 74. The infrared transmission circuit 74 transmits the infrared rays 82 to the television receiver set 88 in step S72.

The television receiver set 88 is set and operated in accordance with the operational command carried on the infrared signal 82 received. The television receiver set 88 may not be able of returning the status signal indicative of the completion of setting. In such a case, as described above, the status signal indicative of the completion of setting is generated by the infrared communication support subsection 56.

As shown in FIG. 7C through connector D, since the status signal indicative of the completion of setting generated by the infrared communication support subsection 56 is in compliance with the communications protocol, the home gateway device 20 proceeds to step S58 in which the status data is decoded with reference to the table 48 and the status contained in the status data by the controller 40.

More specifically, the controller 40 decodes the status data in step S58. The subsequent steps are the same as in the case of washing machine 86.

As shown in step S74, FIG. 7B, the signal containing an operational command of the video recorder/player 90 is converted by the base processor 24 to data which can be handled by the home appliance control processor 26, and the data thus converted is transmitted to the home appliance control processor 26. The home appliance control processor 26 determines that the signal supplied indicates a command to operate the video recorder/player 90 on the basis of the signal type bind data, which is shown in FIG. 8, converts the command signal in accordance with the DLNA standard, and transmits the command signal as converted to the DLNA communication processor 64 by use of the communications protocol in step S76. The video recorder/player 90 serves as a trigger to associate information items by binding. For example, the command signal indicates the settings of timer recording such that the video recorder/player 90 is turned on, the channel after turned on is switched to "channel 8", the day of week is "Thursday", the start time is "22:00", the stop time is "23:00", and the target storage is "hard disk". The DLNA communication support subsection 58 of the controller 40 serves to convert these settings in accordance with the DLNA standards.

Next in step S78, the DLNA communication processor 64 generates a DLNA signal 70 on the basis of the data supplied, and outputs the DLNA signal 70 to the DLNA interface circuit 76. The DLNA interface circuit 76 transmits the DLNA signal 84 to the video recorder/player 90 in step S80.

The video recorder/player 90 is set and operated in accordance with the operational command carried on the DLNA signal 84 received.

Next, as shown in step S82, FIG. 7C, through connector E, the video recorder/player 90 transmits the DLNA signal 84 containing, for example, a status signal indicative of the completion of setting the recording conditions to the DLNA interface circuit 76. Namely, the DLNA interface circuit 76 receives the DLNA signal 84 indicative of the status supplied from the video recorder/player 90. The DLNA signal 84 is in conformity with the DNLA standard and transmitted to the DLNA communication support subsection 58 of the controller 40.

The home gateway device 20 converts the DLNA signal 84 to the data under the communications protocol by the DLNA communication support subsection 58 of the controller 40 in step S84. Next in step S58, the controller 40 decodes the converted data with reference to the table 48 to obtain the status data contained in the converted data. The subsequent steps are the same as in the case of washing machine 86.

As has been discussed above, even when a DLNA compliant television receiver set is purchased a new in place of an existing television receiver set, it is possible with the home network system 10 to set the home gateway device 20 connected to the information server 16 over the IP network 12, performing the initial setting for introducing the DLNA compliant television set, and controlling the DLNA compliant television set over the home network system 10. Any other DLNA compliant home appliance can be easily introduced and controlled in the same manner.

Similarly, even if there is a home appliance operable by a different communications protocol among the controlled home appliances 22, it is possible to recognize the communications protocol and instruction information on the basis of the information carried on the signal supplied, i.e. the signal type for transmission and the bind data, and transmit a command signal corresponding to the instruction information by use of the recognized communications protocol. The table 48 contains the information about the respective signals corresponding to the buttons of each home appliance and the related signal processes. By this configuration, the home network system 10 makes it possible to use home appliances connectable to the home network without depending on the specific communications protocols of the home appliances. With the home gateway device 20, it is possible to use the functions of not only the home appliances which are initially compliant and connected to the network from the start when the home network system 10 is introduced but also a home appliance which replaces one of the initially compliant home appliances or introduced anew in the home network system 10. Particularly, even in the case of a home network where various communications protocols may be used by a plurality of implementers with different configurations, it is possible to attain versatile network installability which can be adapted to a variety of family environments.

While home appliances are controlled by a cellular phone in the case of illustrative embodiment described above, the present invention is not limited thereto. Needless to say, the present invention can be applied to the case where a home appliance is controlled by a personal computer or a network home appliance connected to the network through a LAN interface. Furthermore, as apparent from the description of the illustrative embodiment, by use of the gateway device of the present invention, a single cellular phone can be used as a controller terminal for manipulating a plurality of home appliances connected to the home network at anytime and anywhere, as long as the cellular phone can be connected to the network. Also, the result of manipulation can be obtained as effective information.

The entire disclosure of Japanese patent application No. 2007-242399 filed on Sep. 19, 2007, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What we claim is:

1. A gateway device connectable to a telecommunications network and an electronics appliance to be controlled, comprising:
    an input/output circuit for receiving information supplied over the network, and outputting information from the appliance to the network;
    a format converter for converting between first information in a first format handled by the network and second information in a second format handled by said gateway device; and
    a controller for converting the second information to control information for sending control commands to the appliance based on the control information, the control information corresponding to a communications protocol of the appliance,
    said controller comprising:
        a binder for binding information about the communications protocol, a driver, a control setting condition and a control status of the appliance, to each other;
        a memory for storing the information bound; and
        a converter having a first conversion function and a second conversion function, said first conversion function dynamically converting, based on the information stored in said memory, the second information to the control information that corresponds to the communications protocol of the appliance, said second conversion function converting information on the control status changed by control of the appliance to information of a predetermined protocol as response information to be outputted over the network.

2. The device in accordance with claim 1, wherein said controller further comprises:
- a drive signal generator operative in response to the control information for generating a drive signal; and
- a transmitter operative in response to the drive signal for outputting a control signal.

3. The device in accordance with claim 2, wherein said transmitter includes a receiver for receiving a response signal transmitted from the appliance in response to the control signal.

4. The device in accordance with claim 1, wherein said device is connectable over the network to a server for storing the information about the communications protocol, driver, control setting condition and status of the appliance stored in a form of database,
- said gateway device downloading, when the appliance to be controlled is introduced anew, the information on the appliance from the database over the network.

5. A method of controlling electronics appliance to be controlled based on information supplied over a telecommunications network, comprising the steps of:
- retrieving first information for operating the appliance when the first information is not available;
- selecting the first information and downloading information corresponding to the selected first information;
- converting the selected first information to second information in a predetermined format;
- binding the second information to a communications protocol appropriate for the appliance, a driver, a control setting condition and a control status of the appliance, and storing the bound second information;
- converting the second information to control information for sending control commands to the appliance based on the control information, the control information corresponding to the communications protocol of the appliance;
- generating a drive signal on a basis of the control information;
- outputting a control signal to the appliance in response to the drive signal;
- receiving response information indicative of either of a completion of setting and the control status changed by control of the appliance in response to the control signal;
- converting the response information so as to be in a format of the communications protocol;
- converting the response information converted in the communications protocol, to information in the predetermined format; and
- converting the response information converted in the predetermined format, to third information handled in the network, so that an operation of the appliance is confirmed with reference to the third information.

6. The method of claim 5, wherein the binding the second information includes:
- relating the appliance, signal information of the appliance and command information of the appliance to each other, and
- storing a result of the relation in a table.

7. The method of claim 6, further comprising searching the table and determining a signal type of an appliance from the table.

8. The method of claim 6, wherein the converting the response information to information in the predetermined format, includes decoding the response information converted in the communication protocols with reference to the table.

9. The gateway device of claim 1, wherein said binder is configured to relate the appliance, signal information of the appliance and command information of the appliance to each other, and store a result of the relation in a table.

10. The gateway device of claim 9, wherein said controller is configured to search the table and determining a signal type of an appliance from the table.

11. The gateway device of claim 9, wherein said controller is configured to decode the control status information converted in the predetermined protocol with reference to the table.

* * * * *